(12) United States Patent
Antonetti et al.

(10) Patent No.: US 6,443,336 B2
(45) Date of Patent: Sep. 3, 2002

(54) REUSABLE POURING CAP FOR A CONTAINER CAPABLE OF RECEIVING POTABLE LIQUIDS FOR HUMAN CONSUMPTION

(75) Inventors: Massimiliano Antonetti, LaSalle; Pierre Tardif, Longueuil, both of (CA)

(73) Assignee: Trudeau Corporation 1889 Inc., Quebec (CA)

( * ) Notice: Subject to any disclaimer, the term of this patent is extended or adjusted under 35 U.S.C. 154(b) by 0 days.

(21) Appl. No.: 09/822,854

(22) Filed: Apr. 2, 2001

(30) Foreign Application Priority Data

Apr. 13, 2000 (CA) ............................................... 2305041

(51) Int. Cl.[7] ............................................... B22D 37/00
(52) U.S. Cl. ........................ 222/509; 222/518; 222/548
(58) Field of Search ................................. 222/484, 482, 222/509, 518, 548

(56) References Cited

U.S. PATENT DOCUMENTS

| | | |
|---|---|---|
| 2,123,907 A | 7/1938 | Masbach et al. |
| 2,165,825 A | 7/1939 | Von Bultzinglowen |
| 3,095,128 A | 6/1963 | Wonso |
| 3,373,907 A * | 3/1968 | Batrow ........................ 222/509 |
| 4,049,152 A | 9/1977 | Treanor |
| 4,174,053 A | 11/1979 | Shimizu |
| 4,623,076 A | 11/1986 | Karpal |
| 4,979,655 A | 12/1990 | Galluci |
| 4,997,108 A | 3/1991 | Hata |
| 5,005,723 A | 4/1991 | Smallfoot |
| 5,037,015 A | 8/1991 | Collins |
| 5,038,959 A | 8/1991 | Patel |
| 5,139,182 A | 8/1992 | Appla |
| 5,169,602 A | 12/1992 | Pang et al. |
| 5,246,145 A | 9/1993 | Leoncavallo et al. |
| 5,497,892 A | 3/1996 | Takatsuki et al. |
| 5,713,493 A | 2/1998 | Garibaldi |
| 5,944,235 A * | 8/1999 | Won ........................... 222/518 |
| 6,041,982 A | 3/2000 | Cautereels et al. |

FOREIGN PATENT DOCUMENTS

| | | |
|---|---|---|
| DE | 2152725 | 4/1973 |
| EP | 0 169 366 | 1/1986 |

OTHER PUBLICATIONS

Communication dated Dec. 4, 2001 (European Search Report).

* cited by examiner

*Primary Examiner*—Philippe S Derakshani
(74) *Attorney, Agent, or Firm*—Fish & Richardson P.C.

(57) ABSTRACT

A reusable pouring cap for a container capable of receiving potable liquids for human consumption. The cap comprises a cap body having threads for retaining it onto the container and the cap body further comprises an integral upright passageway defining a pouring opening. The cap also comprises a valve for maintaining the passageway closed to prevent discharge of a liquid contained in the container through the pouring opening, an actuated shutter for covering the pouring opening and a single actuator responsive to finger pressure for moving the valve and the shutter.

36 Claims, 6 Drawing Sheets

REUSABLE POURING CAP FOR A CONTAINER CAPABLE OF RECEIVING POTABLE LIQUIDS FOR HUMAN CONSUMPTION

FIELD OF THE INVENTION

The present invention relates to a reusable pouring cap for a container capable of receiving potable liquids for human consumption.

BACKGROUND OF THE INVENTION

U.S. Pat. No. 5,037,015 entitled Cap with integral pouring spout for pitchers issued on Aug. 6, 1991 discloses a cap for pitchers. This cap comprises a cover portion with a push-button that actuates a circular valve from a closed position to an open position. The cap further comprising a spout extending radially outward therefrom and an interior cavity with the liquid passing therethrough when the valve is in the open position. With this external spout, the cap is not particularly aesthetic for a product such as an insulated urn or a thermal container and is not designed to be carried by a user. Furthermore, the spout is subjected to external impact and the push-button can be accidentally pressed. Lastly, there is nothing for blocking the spout when the valve is in the closed position and foreign elements can enter therein.

Thus, there is a need to provide a cap that will not comprise components subject to external impacts that may break these components or accidentally actuated the valve mechanism. There is also a need to provide a cap that is smaller than prior art caps by integrating the entire spout therein and by eliminating external components. Lastly, there is a need to provide a cap having a single actuator for operating a valve that closes and opens the liquid passageway and a shutter that shutters and frees the pouring opening.

OBJECTS AND STATEMENT OF THE INVENTION

It is an object of the invention to provide a reusable pouring cap having an integral upright passageway defining a pouring opening and a single actuator for operating a valve that closes and opens this passageway and for operating a shutter that shutters or frees this opening.

It is a further object of the invention to provide a reusable pouring cap having an integral upright passageway and a rotatable actuator for operating a valve that closes and opens this passageway.

As embodied and broadly described herein, the invention seeks to provide a reusable pouring cap for a container capable of receiving potable liquids for human consumption, said cap comprising a cap body having means for retaining said cap onto the container, said cap body further comprising an integral upright passageway defining a pouring opening; a valve for maintaining said passageway closed to prevent discharge of a liquid contained in the container through said pouring opening, said valve being movable from a first valve position wherein said passageway is closed to a second valve position wherein said passageway is open; an actuated shutter for covering said pouring opening, said shutter being movable from a first shutter position wherein said pouring opening is shuttered to a second shutter position wherein said pouring opening is open; and a single actuator responsive to finger pressure in a first direction for moving said valve from said first valve position to said second valve position and said shutter from said first shutter position to said second shutter position, and responsive to finger pressure in a second direction for allowing said valve to move from said second valve position to said first valve position and for causing said shutter to move from said second shutter position to said first shutter position.

As embodied and broadly described herein, the invention further seeks to provide a reusable pouring cap for a container capable of receiving potable liquids for human consumption, said cap comprising: a cap body having means for retaining said cap onto the container, said cap body further comprising an integral upright passageway defining a pouring opening; a valve for maintaining said passageway hermetically closed to prevent discharge of a liquid contained in the container through said pouring opening; and a rotatable actuator responsive to finger pressure for rotation from a first angular position wherein said passageway is closed to a second angular position wherein said passageway is open.

Preferably, the actuator is a rotatable cover having an opening and a downwardly extending projection that abuts with the upper end of the valve for moving this valve from the first valve position to the second valve position, this cover being also the shutter movable from the first shutter position to the second shutter position.

More preferably, the extending projection has an end defining a cam formation having a top level, a low level and a ramp therebetween and the valve comprises a valve head connected to a valve stem with its upper end defining a cam follower having a top level, a low level and a ramp therebetween, these cam formation and cam follower cooperate together for causing the valve to move from the first valve position to the second valve position.

Advantageously, the cap body comprises a hollow section with the valve mounted therein and a valve seat defining an aperture communicating with the interior of the container, this cap body further comprising a further passageway having a first end defining an air intake and a second end communicating with the aperture.

Other objects and features of the invention will become apparent by reference to the following description and the drawings.

BRIEF DESCRIPTION OF THE DRAWINGS

A detailed description of the preferred embodiment of the invention is provided herein with reference to the following drawings, wherein.

Figure 1:
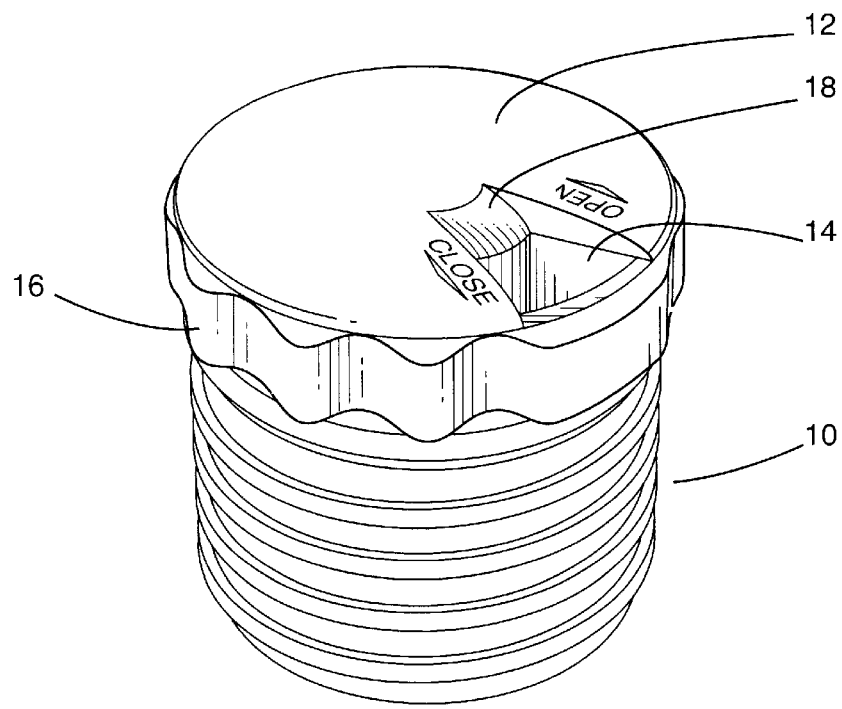
FIG. 1 is a perspective view of a reusable pouring cap for a container capable of receiving potable liquids for human consumption, this cap being constructed in accordance with the invention.
Figure 2:
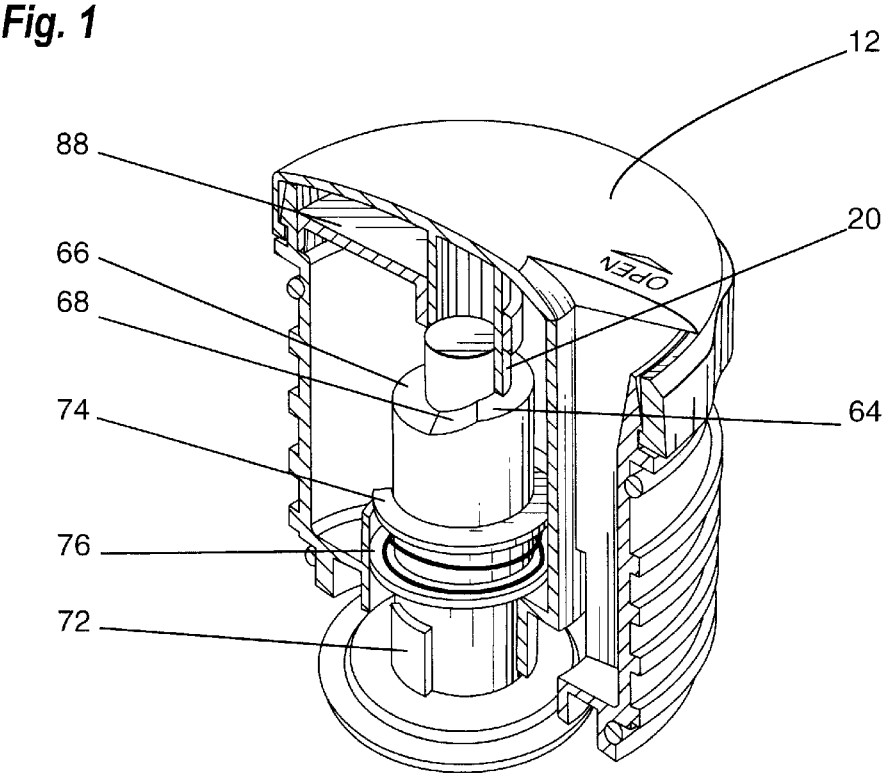
FIG. 2 is a perspective broken-away view of the cap of FIG. 1
Figure 3:
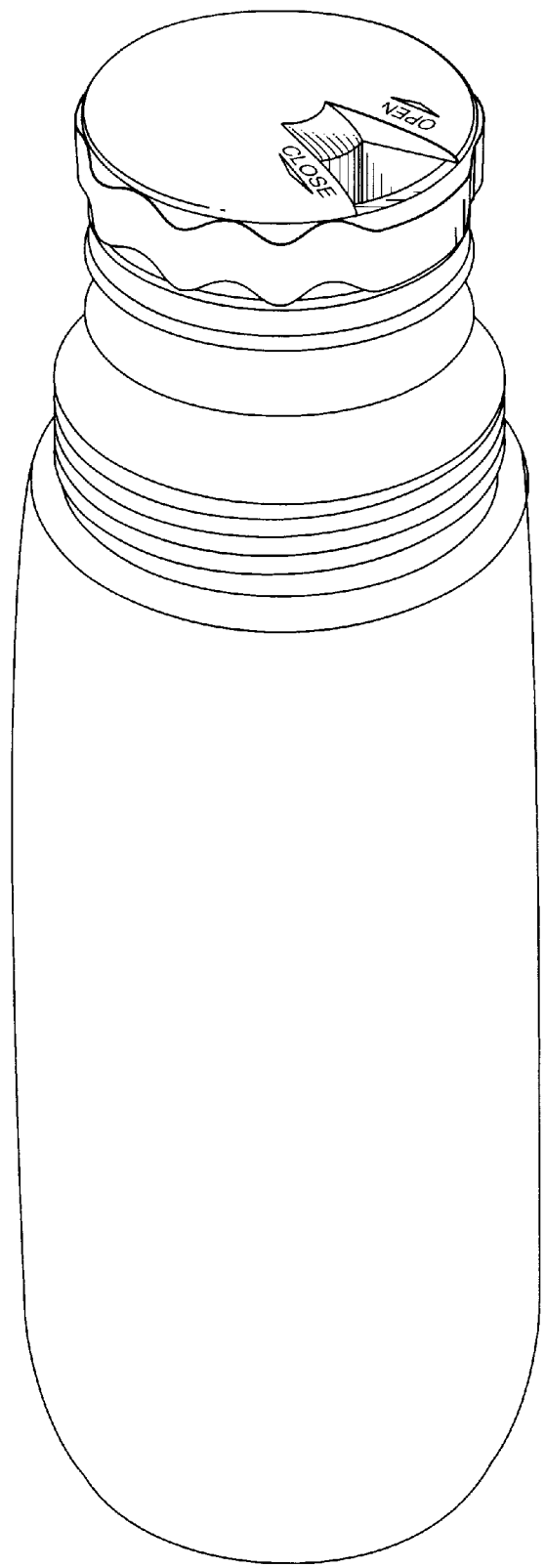
FIG. 3 is a perspective view of the cap of FIG. I inserted into the open top of the container.
Figure 4:
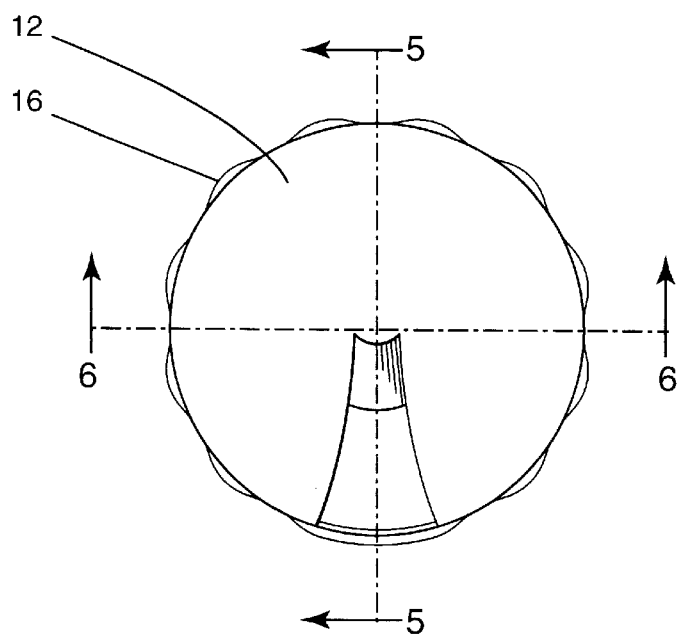
FIG. 4 is a top view of a cover of the cap of FIG. 1.
Figure 5:
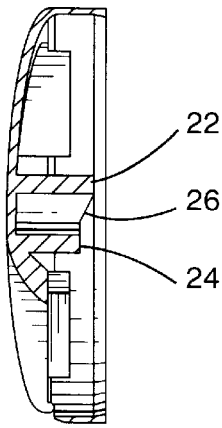
FIG. 5 is a sectional view taken along line 5—5 of FIG. 4.
Figure 6:
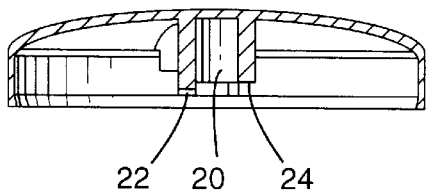
FIG. 6 is a sectional view taken along line 6—6 of FIG. 4.
Figure 7:
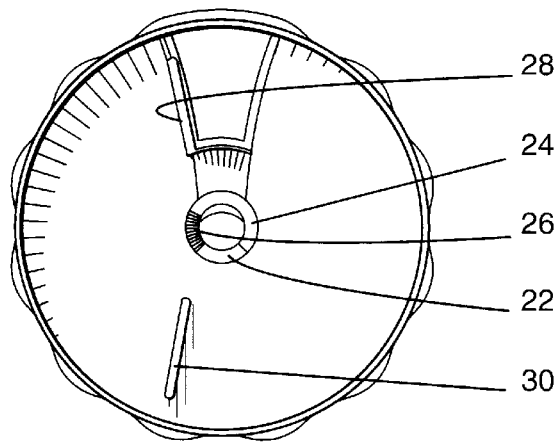
FIG. 7 is a bottom view of the cover of FIG. 4.
Figure 8:
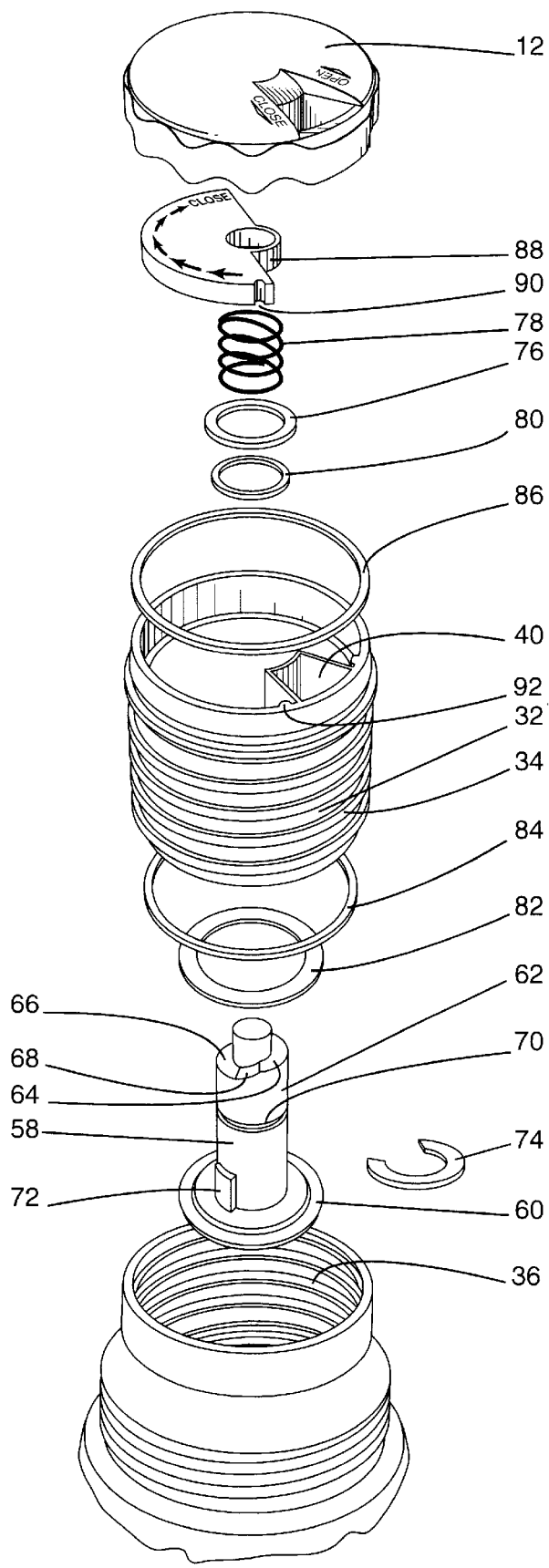
FIG. 8 is an exploded perspective view of the cap of FIG. 1.

In the drawings, preferred embodiments of the invention are: illustrated by way of examples. It is to be expressly understood that the description and drawings are only for the purpose of illustration and are an aid for understanding. They are not intended to be a definition of the limits of the invention.

DETAILED DESCRIPTION OF THE PREFERRED EMBODIMENTS

FIG. 1 illustrates a reusable pouring cap 10 for a container capable of receiving potable liquids for human consumption. Cap 10 comprises a rotatable cover 12 having an opening 14 and gripping portions 16 such as ridge-like protrusions substantially equally spaced around the outside surface of the cover 12. Cover 12 also comprises an inclined surface 18 and direction indications OPEN and CLOSE with an underneath arrow.

As seen on FIGS. 4 to 7, cover 12 comprises an extending projection 20 having its end defining a came formation with a top level 22, a low level 24 and a ram 26 therebetween. Cover 12 also comprises stoppers 28 and 30.

Referring to FIGS. 8 to 12, it can be seen that cap 10 comprises a cap body 32 having external threads 34 engaging with internal threads 36 provided into the top of the container.

These threads thus allow cap 10 to be retained onto the container. Cap body 32 further comprises an upright passageway 38 defining at its upper end a pouring opening 40 and having its other end 42 communicating with an aperture 44. Cap body 32 comprises a valve seat 46 defining aperture 44 that communicates with the interior of the container. Cap body 32 also comprises a further passageway 48 defining an air intake 50 at its upper end and having the other end 52 communicating with aperture 44. Lastly, cap body 32 includes a hollow section 54 defining an upper extending disk portion 6.

Cap 10 further comprises a valve 58 comprising a valve head 60 connected to a valve stem 62 with at its end a came follower having a top level 64, a low level 66 and a ramp 68 therebetween. Valve 58 also comprises a groove 70 and strips 72 that prevents its rotation. Mounted on valve 58, there are a clip 74 inserted in groove 70, a washer 76 and a spring 78 mounted between clip 74 and washer 76 that has a diameter sufficiently large for maintaining in place valve 58. A sealing ring 80 is mounted between washer 76 and disk portion 56. Clip 74, spring 78 and washer 76 constitute means for biasing valve head 60 against valve seat 46 and for maintaining passageway 38 closed to prevent discharge of a liquid contained in the container through pouring opening 40. A sealing ring 82 is mounted on valve head 60.

Sealing rings 84 and 86 are mounted on cap body 32 for reducing the likelihood of infiltration of liquid between cap 10 and the container.

Cap 10 further comprises a member 88 located between cover 12 and the upper portion of cap body 32, member 88 having a notch 90 receiving a rib 92 for preventing its rotation. Member 88 comprises indicators in the form of arrows and the word CLOSE appearing thereon.

Figure 12:
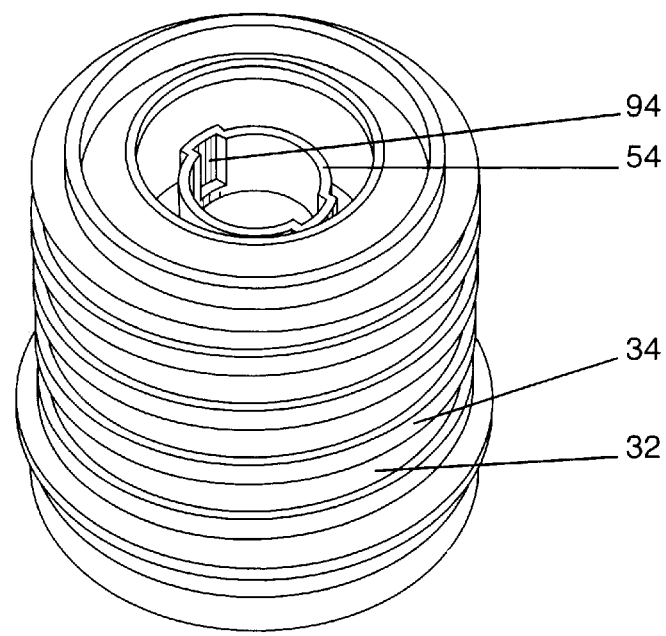
FIG. 12 is a bottom perspective view of the cap body of FIG. 11.

As seen on FIG. 12, hollow section 54 comprises longitudinal recesses 94 receiving strips 72 for preventing rotation of valve 58.

Figure 9:
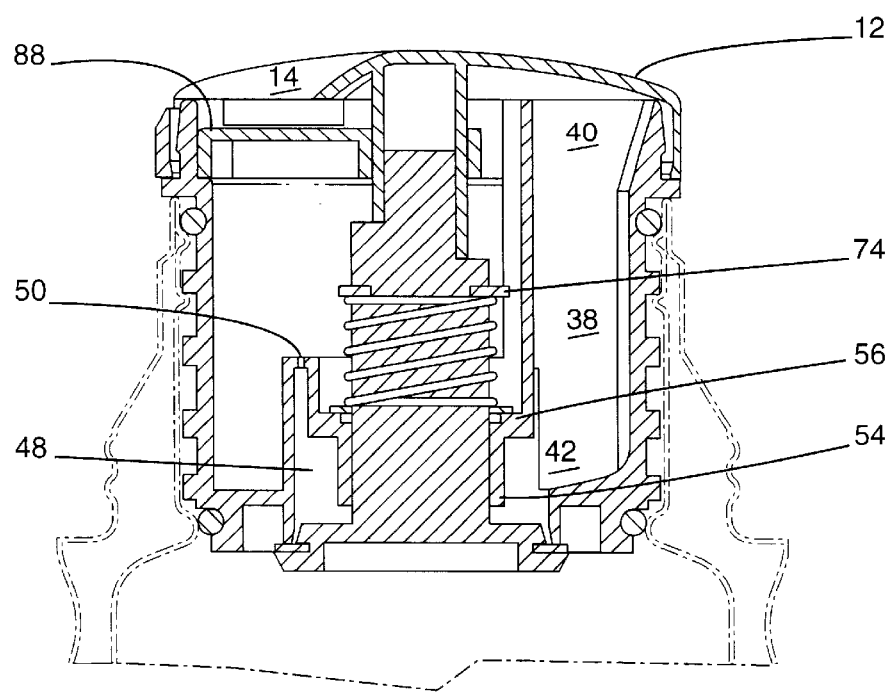
FIG. 9 is a sectional view of the cap of FIG. 1 wherein the cap is illustrated in a closed valve position and in a closed shutter position.

Referring now more specifically to FIG. 9, it can be seen that valve 58 is in a first valve position wherein passageway 38 is closed by valve head 60 that seats against valve seat 46 and cover 12 is in a first shutter position wherein it shutters pouring opening 40. In the first valve position, top level 22, ramp 26 and low level 24 of projection 20 contact with respective low level 66, ramp 68 and top level 64 of valve stem 62.

Figure 10:
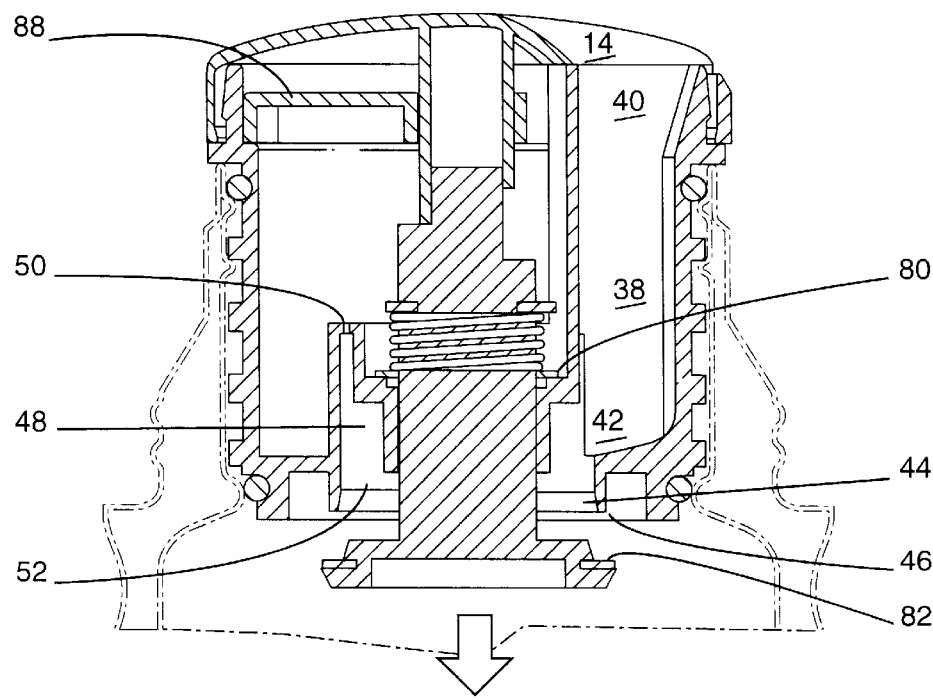
FIG. 10 is sectional view of the cap of FIG. 1 wherein the cap is illustrated in an open valve position and in an open shutter position.
Figure 11:
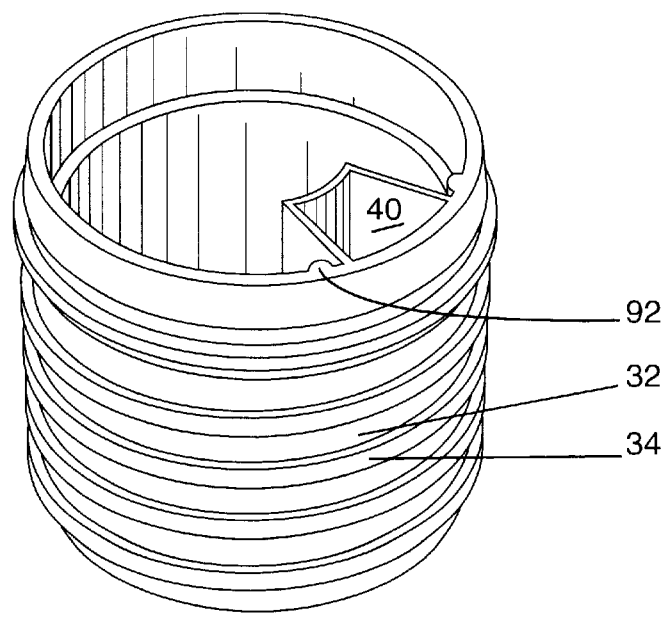
FIG. 11 is a top perspective view of a cap body of the cap of FIG. 1.

FIG. 10 illustrates cap 10 in its open position after the user has rotated cover 12 that is an actuator responsive to finger pressure in a first direction for moving valve 58 from its first valve position towards a second valve position and for moving cover 12 from its first shutter position towards its second shutter position.

As illustrated on FIG. 10, in the second valve position, valve head 60 frees valve seat 46 for allowing passage of liquids through aperture 44, passageway 38 and sprout opening 40, and in the second shutter position, cover 12 frees pouring opening 40 for allowing discharge of liquids. At the same time, air passes through air intake 50, further passageway 48 and aperture 44, for creating a uniform liquid discharge. In the second valve position, top level 22 of projection 20 contacts with top level 64 of valve stem 62. The same cover 12 is responsive to finger pressure in a second direction for allowing valve 58 to move upwardly and for causing cover 12 to shutter pouring opening 40.

Cover 12 is thus a single actuator responsive to finger pressure in first and second directions for operating valve 58 and for shuttering or freeing pouring aperture 40.

Advantageously, cover 12 is a rotatable actuator responsive to finger pressure for rotation from a first angular position wherein passageway 38 is closed by valve head 60 that seats against valve seat 46 to a second angular position wherein valve head 60 frees valve seat 46 for allowing passage of liquids through aperture 44 and passageway 38.

As seen on FIG. 9, member 88 blocks access to the interior of cap body 32 through opening 14 when this opening and sprout opening 40 do not overlap. Member 88 also abuts with stopper 28 and 30. In fact, when the user turns cover 12 towards its open position and reaches the position wherein aperture 14 and pouring aperture 40 overlap, stopper 28 abuts with member 88, and from there, further rotation of cover 12 will unscrew cap 10 from the container. When the user turns cover 12 towards its closed position and reaches the position where it is possible to read CLOSE through opening 14, stopper 30 abuts with member 88 and no further rotation is possible.

The above description of preferred embodiments should not be interpreted in a limiting manner since other variations, modifications and refinements are possible within the spirit and scope of the present invention. The scope of the invention is defined in the appended claims and their equivalents.

What is claimed is:

1. A reusable pouring cap for a container capable of receiving potable liquids for human consumption, said cap comprising:
   a) a cap body having means for retaining said cap onto the container, said cap body further comprising an integral upright passageway defining a pouring opening;
   b) a valve for maintaining said passageway closed to prevent discharge of a liquid contained in the container through said pouring opening, said valve being movable from a first valve position wherein said passageway is closed to a second valve position wherein said passageway is open;

c) an actuated shutter for covering said pouring opening, said shutter being movable from a first shutter position wherein said pouring opening is shuttered to a second shutter position wherein said pouring opening is open; and d) a single actuator responsive to finger pressure in a first direction for moving said valve from said first valve position to said second valve position and said shutter from said first shutter position to said second shutter position, and responsive to finger pressure in a second direction for allowing said valve to move from said second valve position to said first valve position and for causing said shutter to move from said second shutter position to said first shutter position.

2. A cap as defined in claim 1, wherein said actuator is a rotatable cover having an opening and a downwardly extending projection, said cover being movable from a first angular position wherein said passageway is closed to a second angular position wherein said passageway is open.

3. A cap as defined in claim 2, wherein said rotatable cover is movable from said first shutter position to said second shutter position.

4. A cap as defined in claim 3, wherein said extending projection has an end defining a came formation having a top level, a low level and a ramp therebetween and wherein said valve comprises a valve head connected to a valve stem with a came follower contacting said came formation, said came formation being movable between a first position wherein said passageway is closed to a second position wherein said passageway is open.

5. A cap as defined in claim 4, wherein said came follower comprises a top level, a low level and a ramp therebetween.

6. A cap as defined in claim 4, wherein said cap body further comprises a hollow section with said valve mounted therein and a valve seat defining an aperture communicating with the interior of the container.

7. A cap as defined in claim 6, wherein said valve is moveable between said first valve position wherein said head seats against said valve seat to said second valve position.

8. A cap as defined in claim 1, wherein said cap body further comprises a further passageway having a first end defining an air intake and a second end communicating with said aperture.

9. A cap as defined in claim 1, wherein said valve further comprises means for preventing its rotation.

10. A cap as defined in claim 6, wherein said valve comprises means for biasing said head against said valve seat.

11. A cap as defined in claim 6, wherein said hollow section defines an upper extending disk portion and said valve stem comprises a groove with a clip mounted therein and a spring mounted between said disk portion and said clip.

12. A cap as defined in claim 11, wherein said spring is compressed in said second position.

13. A cap as defined in claim 12, wherein said valve further comprises a washer mounted between said spring and said disk portion.

14. A cap as defined in claim 13, wherein said valve further comprises a sealing ring between said washer and said disk portion.

15. A cap as defined in claim 1, wherein said cap further comprises a sealing ring mounted between said cap body and the container.

16. A cap as defined in claim 1, wherein said cap further comprises a member located between said cap body and said cover for blocking access to the interior of said cap body through said opening of said cover when said pouring opening and said opening of said cover do not overlap.

17. A cap as defined in claim 16, wherein said member comprises position indicators appearing thereon.

18. A cap as defined in claim 1, wherein said valve further comprises a sealing means.

19. A reusable pouring cap for a container capable of receiving potable liquids for human consumption, said cap comprising:

(a) a cap body having means for retaining said cap onto the container, said cap body further comprising an integral upright passageway defining a pouring opening;

(b) a valve for maintaining said passageway hermetically closed to prevent discharge of a liquid contained in the container through said pouring opening;

(c) a rotatable actuator responsive to finger pressure for rotation from a first angular position wherein said passageway is closed to a second angular position wherein said passageway is open; and (d) a shutter for shuttering said pouring opening in said first angular position and for freeing said pouring opening in said second angular position, said shutter being actuated by said rotatable actuator.

20. A cap as defined in claim 19, wherein said rotatable actuator is a cover having an opening and a downwardly extending projection, said cover being movable from a first angular position wherein said passageway is closed to a second angular position wherein said passageway is open.

21. A cap as defined in claim 20, wherein said rotatable cover is movable from said first shutter position to said second shutter position.

22. A cap as defined in claim 21, wherein said extending projection has an end defining a came formation having a top level, a low level and a ramp therebetween and wherein said valve comprises a valve head connected to a valve stem with a came follower contacting said came formation, said came formation being movable between a first position wherein said passageway is closed to a second position wherein said passageway is open.

23. A cap as defined in claim 22, wherein said came follower comprises a top level, a low level and a ramp therebetween.

24. A cap as defined in claim 22, wherein said cap body further comprises a hollow section with said valve mounted therein and a valve seat defining an aperture communicating with the interior of the container.

25. A cap as defined in claim 24, wherein said valve is moveable between a first valve position wherein said head seats against said valve seat to said second valve position.

26. A cap as defined in claim 20, wherein said cap body further comprises a further passageway having a first end defining an air intake and a second end communicating with said aperture.

27. A cap as defined in claim 20, wherein said valve comprises means for preventing its rotation.

28. A cap as defined in claim 24, wherein said valve comprises means for biasing said head against said valve seat.

29. A cap as defined in claim 24, wherein said hollow section defines an upper extending disk portion and said valve stem comprises a groove with a clip mounted therein and a spring mounted between said disk portion and said clip.

30. A cap as defined in claim 29, wherein said spring is compressed in said second position.

31. A cap as defined in claim 30, wherein said valve further comprises a washer mounted between said spring and said disk position.

32. A cap as defined in claim 31, wherein said valve further comprises a sealing ring between said washer and said disk portion.

33. A cap as defined in claim 20, wherein said cap further comprises a sealing ring mounted between said cap body and the container.

34. A cap as defined in claim 20, said cap further comprises a member located between said cap body and said cover for blocking access to the interior of said cap body though said opening of said cover when said pouring opening and said opening of said cover do not overlap.

35. A cap as defined in claim 34, wherein said member comprises position indicators appearing thereon.

36. A cap as defined in claim 20, wherein said valve further comprises a sealing means.

* * * * *